US012711360B2

(12) United States Patent
Kubota et al.

(10) Patent No.: US 12,711,360 B2
(45) Date of Patent: Aug. 18, 2026

(54) LEARNING DEVICE, LEARNING METHOD, AND LEARNING PROGRAM

(71) Applicant: NEC Corporation, Tokyo (JP)

(72) Inventors: Dai Kubota, Tokyo (JP); Riki Eto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 498 days.

(21) Appl. No.: 18/287,132

(22) PCT Filed: Apr. 27, 2021

(86) PCT No.: PCT/JP2021/016728
§ 371 (c)(1),
(2) Date: Oct. 16, 2023

(87) PCT Pub. No.: WO2022/230038
PCT Pub. Date: Nov. 3, 2022

(65) Prior Publication Data

US 2024/0202504 A1 Jun. 20, 2024

(51) Int. Cl.
*G06N 3/048* (2023.01)
*G06N 3/092* (2023.01)

(52) U.S. Cl.
CPC ............ *G06N 3/048* (2023.01); *G06N 3/092* (2023.01)

(58) Field of Classification Search
None
See application file for complete search history.

(56) References Cited

U.S. PATENT DOCUMENTS

2022/0076431 A1* 3/2022 Ansari .................... G06T 7/215
2022/0188851 A1* 6/2022 Zhou ........................ G06N 7/01

FOREIGN PATENT DOCUMENTS

JP 7327512 B2 * 8/2023 ............... G06N 5/01

OTHER PUBLICATIONS

English translation of JP-7327512-B2, 江藤, 2023 (Year: 2023).*
International Search Report for PCT Application No. PCT/JP2021/016728, mailed on Jul. 20, 2021.
B. D. Ziebart, A. Maas, J. A. Bagnell, and A. K. Dey, “Maximum entropy inverse reinforcement learning,” In AAAI, AAAI ’08, 2008, pp. 1433-1438.
Scobee, R. R. Dexter et al., “Maximum Likelihood Constraint Inference for Inverse Reinforcement Learning”. arViv, [online], 2020, pp. 1-12, Internet:<URL:https://arxiv.org/abs/1909.05477v2>.
Chou, Glen et al., “Learning Constraints from Demonstrations”. arXiv, 2019. pp. 1-25, Internet:<URL:https://arxiv.org/abs/1812.07084v2>.

(Continued)

*Primary Examiner* — James M Hannett
(74) *Attorney, Agent, or Firm* — Sughrue Mion, PLLC

(57) ABSTRACT

The input means 81 accepts input of trajectory data indicating the subject’s decision-making history. The learning means 82 performs inverse reinforcement learning using the trajectory data. The output means 83 outputs a reward function and a constraint condition derived by inverse reinforcement learning. Here, the learning means 82 performs inverse reinforcement learning based on distribution of the trajectory data calculated using a differentiable function that indicates distribution of the constraint condition.

10 Claims, 5 Drawing Sheets

(56) References Cited

OTHER PUBLICATIONS

JP Official Communication for JP Application No. 2023-516888, mailed on Jun. 25, 2024 with English Translation.
Yuki Nakaguchi et al., "Construction of Inverse Reinforcement Dynamics Learning Framework based on Maximum Entropy Principle", The 33rd Annual Conference of the Japanese Society for Artificial Intelligence, Jun. 7, 2019, pp. 1-4.
"NEC moves from one-shot decision making to practical use with inverse reinforcement learning for imitation learning that understands expert intent", NIKKEI Robotics, Sep. 10, 2019, vol. 51, pp. 22-26.

* cited by examiner

LEARNING DEVICE, LEARNING METHOD, AND LEARNING PROGRAM

This application is a National Stage Entry of PCT/JP2021/016728 filed on Apr. 27, 2021, the contents of all of which are incorporated herein by reference, in their entirety.

TECHNICAL FIELD

This invention relates to a learning device, a learning method, and a learning program that performs inverse reinforcement learning.

BACKGROUND ART

In various fields, a shortage of successors to expert engineers is becoming an issue. In addition, automation of robot and automobile operations is being promoted in order to reduce human costs. Under these circumstances, models are often used to reproduce the actions of experts or to automate robots. However, the objective function used in the model and the setting of constraint conditions that prohibit actions are difficult to do manually, which leads to problems such as the breakdown of expert skills and increased costs in spreading automation.

Reinforcement Learning (RL) is known as one of the machine learning methods. Reinforcement learning is a method to learn behaviors that maximize value through trial and error of various actions. In reinforcement learning, a reward function is set to evaluate this value, and the action that maximizes this reward function is searched for. However, setting the reward function is generally difficult.

Inverse reinforcement learning (IRL) is known as a method to facilitate the setting of this reward function. In inverse reinforcement learning, an objective function (reward function) that reflects the intention of an expert is generated by repeating optimization using the objective function (reward function) and updating the parameters of the objective function (reward function), using the decision-making history data of the expert.

Non-patent literature 1 describes Maximum Entropy Inverse Reinforcement Learning (ME-IRL), which is a type of inverse reinforcement learning. In ME-IRL, the distribution of trajectories is specified using the maximum entropy principle, and the reward function is learned by approaching the true distribution (i.e. maximum likelihood estimation). This solves the indefiniteness of the existence of multiple objective functions (reward functions) that reproduce the trajectory (action history) of an expert.

Non-patent literature 2 also describes a method for learning constraint conditions based on the maximum entropy inverse reinforcement learning technique. In the method described in non-patent literature 2, the parameters indicating the constraint conditions are learned under the assumption that the objective function is known.

Non-patent literature 3 also describes a method for learning constraint conditions. The method described in non-patent literature 3 uses Lagrange's undetermined multiplier to learn constraint conditions from data indicating human actions.

CITATION LIST

Non Patent Literature

NPL 1: B. D. Ziebart, A. Maas, J. A. Bagnell, and A. K. Dey, "Maximum entropy inverse reinforcement learning," In AAAI, AAAI '08, 2008.

NPL 2: Scobee, Dexter RR, and S. Shankar Sastry, "Maximum Likelihood Constraint Inference for Inverse Reinforcement Learning," International Conference on Learning Representations, 2019.

NPL 3: Chou, Glen, Dmitry Berenson, and Necmiye Ozay, "Learning constraints from demonstrations", International Workshop on the Algorithmic Foundations of Robotics. Springer, Cham, 2018.

SUMMARY OF INVENTION

Technical Problem

When setting the objective function, which is the object of optimization, work may be performed with implicitly set constraint conditions such as prohibited actions or rules. In such cases, in reverse reinforcement learning, etc., as described above, reproduces the decision making of an expert by learning only the objective function (reward function) from the data. However, if a decision is made to optimize the reward function while simultaneously satisfying constraint conditions, the method itself cannot be applied unless the constraint conditions are known in advance and the reward function is set.

For example, the ME-IRL described in non-patent literature 1 can estimate the objective function (reward function) in a Markov decision process from data indicating human behavior such as experts (hereinafter sometimes referred to as demonstration data). However, the problem is that the constraints on the expert's behavior must be given in advance.

Although the method described in non-patent literature 2 can learn constraint conditions from demonstration data of an expert, there is a problem that the objective function (reward function) must be given in advance as a known one. Furthermore, the method described in non-patent literature 2 requires multiple candidate constraint conditions whose parameters are not changed to be prepared in advance, and if these candidate constraint conditions deviate from the assumption, it cannot be learned well.

On the other hand, by using the learning method described in non-patent literature 3, it is possible to estimate the objective function (reward function) and constraint conditions from demonstration data of an expert. However, the learning method described in non-patent literature 3 assumes that all demonstration data are mathematically optimal solutions. Therefore, the trajectory data indicating decision-making history that includes human actions and information indicating the state that was the source of the action (hereinafter, this may also be referred to as status information) may contain noise, or there may be non-stationarity or failure data. In such cases, it is difficult to correctly estimate the objective function and constraint conditions, and depending on data variations, the result may be that there is no solution.

Therefore, it is an exemplary object of the present invention to provide a learning device, a learning method, and a learning program that can simultaneously learn an appropriate reward function and constraint conditions when inverse reinforcement learning is performed using trajectory data indicating human decision-making history.

Solution to Problem

The learning device according to this invention includes: an input means which accepts input of trajectory data indicating the subject's decision-making history, a learning means which performs inverse reinforcement learning using the trajectory data; and an output means which outputs a reward function and a constraint condition derived by inverse reinforcement learning, wherein the learning means performs inverse reinforcement learning based on distribution of the trajectory data calculated using a differentiable function that indicates distribution of the constraint condition.

The learning method according to this invention includes: accepting input of trajectory data indicating the subject's decision-making history; performing inverse reinforcement learning using the trajectory data; outputting a reward function and a constraint condition derived by inverse reinforcement learning; and in inverse reinforcement learning, inverse reinforcement learning is performed based on distribution of the trajectory data calculated using a differentiable function that indicates distribution of the constraint condition.

The learning program according to this invention for causing a computer to execute: input processing to accept input of trajectory data indicating the subject's decision-making history; learning processing to perform inverse reinforcement learning using the action trajectory data; and output processing to output a reward function and a constraint condition derived by inverse reinforcement learning, wherein inverse reinforcement learning is performed based on distribution of the trajectory data calculated using a differentiable function that indicates distribution of the constraint condition, in the learning processing.

Advantageous Effects of Invention

According to the present invention, an appropriate reward function and constraint conditions can be learned simultaneously when inverse reinforcement learning is performed using trajectory data indicating human decision-making history.

DESCRIPTION OF EMBODIMENTS

The exemplary embodiment of this invention will be described below with reference to the drawings.

Figure 1:
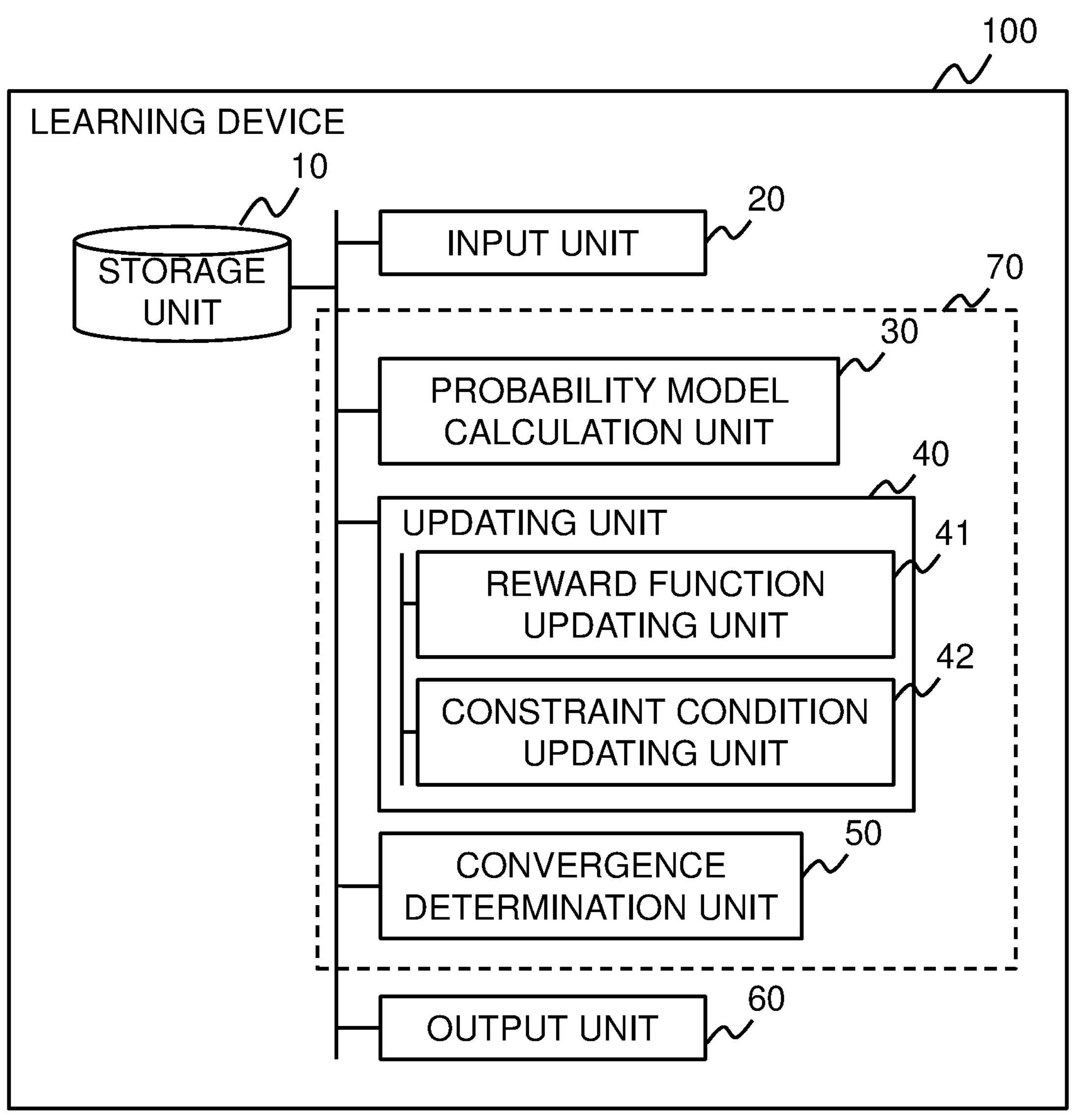
FIG. 1 It depicts a block diagram illustrating a configuration example of one exemplary embodiment of a learning device according to the present invention.

FIG. 1 is a block diagram illustrating a configuration example of one exemplary embodiment of a learning device according to the present invention. A learning device 100 of this exemplary embodiment is a device that performs inverse reinforcement learning, in which a reward function is estimated from trajectory data indicating a decision-making history that includes the subject's (expert's) action and information indicating the state that was the source of the action (i.e., state information) by machine learning, and a device that specifically performs information processing based on the action characteristics of the subject (expert). In the following description, trajectory data indicating decision-making history may be simply referred to as trajectory data or demonstration data. The learning device 100 includes a storage unit 10, an input unit 20, a learning unit 70, and an output unit 60.

The storage unit 10 stores information necessary for the learning device 100 to perform various processes. The storage unit 10 may store trajectory data of the subject's decision-making history received by the input unit 20, which will be described later. The storage unit 10 may also store a probability model used by the learning unit 70, which will be described later. The storage unit 10 is realized by, for example, a magnetic disk.

The input unit 20 accepts inputs of information necessary for the learning device 100 to perform various processes. Specifically, the input unit 20 accepts input of trajectory data and a probability model that assumes the distribution of the trajectory data.

Here, the trajectory data (demonstration data) is further explained. Inverse reinforcement learning is performed using trajectory data. The trajectory data, as described above, indicates the decision-making history that includes the subject's (expert's) actions and the state information that was the source of those actions. Various types of data can be used as the trajectory data. For example, the trajectory data includes the history of actions taken in the past in the target environment (history of which actions were taken in which state). It is suitable that this action was performed by an expert who is familiar with the handling of the target environment. However, this action is not necessarily limited to those performed by the experts.

In other cases, for example, the trajectory data may indicate a history of past actions taken in an environment other than the target environment (hereinafter referred to as the target environment). Preferably, this environment is similar to the target environment. For example, it is assumed that the target environment is a facility such as a power generation system, and the action is to control the facility. In this case, to learn a policy function and a reward function for the newly installed facility, the history of actions taken at an existing facility that is similar to the facility may be used.

The trajectory data may be other than a history of actual actions taken in a given state. For example, the trajectory data may be manually generated. Other times, for example, the trajectory data may be randomly generated. That is, the trajectory data may be generated by mapping each state in the target environment to a randomly selected action from among possible actions.

The following is a detailed description of the probabilistic model used by this exemplary embodiment of the learning device 100. The learning device 100 of this exemplary embodiment employs the maximum entropy principle, which is used in maximum entropy inverse reinforcement learning, where the reward function (objective function) can be appropriately estimated from the demonstration data, even if there are variations in the data.

Then, a probability model is defined that indicates the data distribution such that both the parameters of the reward function and the parameters of the constraint conditions are included, so that the reward function and the constraint conditions can be learned simultaneously. Therefore, in this exemplary embodiment, the input unit 20 accepts input of a probability model that assumes the distribution of the demonstration data derived by the maximum entropy principle, based on the reward function and the constraint conditions. By using the maximum entropy principle, it is possible to learn appropriately even if there is variation in the data associated with human data and other data.

It is assumed that the reward function $f_\theta(x)$ is indicated by the parameter θ to be estimated and the constraint conditions $g_{cm}(x) \geq 0$ is indicated by the parameter $c_m$ to be estimated. In the following description, the parameter θ is sometimes written as the first parameter and the parameter $c_m$ is sometimes written as the second parameter. In this case, a probabilistic model is defined so that both parameters (the first parameter and the second parameter) are included in the data distribution p(x) (hereinafter simply referred to as the data distribution) of the trajectory data, which is then attributed to the problem of estimating θ and $c_m$ as model parameters.

The probabilistic model assuming a data distribution derived by the maximum entropy principle based on the reward function and constraint conditions can be specifically defined as in Equation 1, which is illustrated below. In Equation 1, x is the feature vector, c is the parameter of the constraint conditions, and m is the number of constraint conditions.

[Math. 1]

$$p(x) = \frac{e^{f_\theta(x)}}{Z(\theta, c)} \prod_{m=1}^{M} \sigma(g_{c_m}(x)) \qquad \text{(Equation 1)}$$

$$\text{where } Z(\theta, c) = \sum_x e^{f_\theta(x)} \prod_{m=1}^{M} \sigma(g_{c_m}(x))$$

The probability model illustrated in Equation 1 above includes a function indicating the distribution based on the objective function (hereinafter referred to as a first function) and a function indicating the distribution based on the constraint conditions (hereinafter referred to as a second function), and is a model defined by the product of the first function (specifically, the part of $e^{f\theta(x)}/Z(\theta, c)$) and the second function (specifically, the part of $\Pi_{m=1}^{M}\sigma(g_{cm}(x))$). As illustrated in Equation 1, the probability model is defined as a function that takes a larger probability value the larger the value of the reward function, and a larger the probability value the more constraint conditions are satisfied.

Specifically, the first function is a function based on the reward function among the (probability) distribution of trajectories, and is a function with the property that the larger the value of the reward function, the larger the value of the probability. The first function is the same as the function that represents the distribution assumed in the maximum entropy inverse reinforcement learning described in non-patent literature 1.

The second function is a function such that the more each constraint is satisfied, the closer it approaches 1, and the less each constraint is satisfied, the closer it approaches 0, and is defined as a function differentiable by the second parameter (i.e., $c_m$) (sometimes hereafter written as a differentiable function).

More specifically, as illustrated in Equation 1 above, the second function is defined by the total power Π of σ whose argument is a function $g_{cm}(x)$ that takes non-negative values when each constraint 1 to m is satisfied. σ is a continuous function that converts the value of its argument from 0 to 1, for example, a sigmoidal function or soft max function.

That is, if σ is a sigmoid function and the argument of the function is y, then

[Math. 2]

$$\sigma(y) = \frac{1}{1 + e^{-y}}.$$

Z(θ, c) is a normalizing constant such that the sum (integral) of the entire distribution is 1. The parameter expressions for the first function and the second function are predetermined by the designer and others.

The constraint $g_{cm}(x) \geq 0$ in the second function is determined according to the problem to which the learning results (reward function, etc.) are applied. Here, aspects of the constraint conditions will be explained using two specific examples.

The first specific example is the case where the learning results of the present invention are applied to a mixed integer programming problem. The variable vector (feature vector) x to be optimized in the mixed integer programming problem consists of continuous or integer variables for each vector element. This variable vector x to be optimized corresponds to the features in inverse reinforcement learning and is also consistent with the state. For this variable vector x, the constraint condition $g_{cm}(x) \geq 0$ specifically results in $A_m x + b_m \geq 0$, and the parameter $c_m$ of the constraint condition means $c_m = (A_m, b_m)$. Note that $A_m$ is a matrix (coefficient vector) and $b_m$ is a vector (scalar quantity).

In general, the constraint conditions include not only inequalities, but also the equality $g_{cm}(x) = 0$. This is expressed by $g_{cm}(x) \geq 0$ and $g_{cm}(x) \leq 0$.

Mixed integer programming problems include both linear programming problem and integer programming problem. Therefore, the learning results from this invention can be applied to the lower problem classes, such as the traveling salesman problem, the work scheduling problem, and the knapsack problem.

The second specific example is the case where the learning results of the invention are applied to image recognition or robot control. In this case, unlike in mixed integer programming problems, the constraint condition $g_{cm}(x)$ for a state variable x different from the features cannot generally be expressed by a linear expression for x. Therefore, in this case, the parameters of $g_{cm}(x)$ may be set manually in advance based on domain knowledge or may be represented by a neural network.

When $g_{cm}(x)$ is represented by a neural network, x corresponds to an input vector of the neural network, a parameter $c_m$ corresponds to the set of hyperparameters in the neural network, and an output of the network corresponds to $g_{cm}(x)$.

Furthermore, there is generally not just one constraint condition. So, instead of defining a separate neural network for each $g_{cm}(x)$ for different m, for example, one neural network may be defined such that x is an input vector of the neural network and an output of the network is $[g_{c1}(x), g_{c2}(x), \ldots, g_{cM}(x)$.

Note that in this exemplary embodiment, it is applied to a function σ (e.g., a sigmoid function) that converts the output from the neural network into a value between 0 and 1, so the output value of the second function will be 0 to 1 even if these constraint conditions $g_{cm}(x)$ are used.

The learning unit 70 includes a probability model calculation unit 30, an updating unit 40, and a convergence determination unit 50. The learning unit 70 in this exemplary embodiment performs inverse reinforcement learning using the trajectory data described above. The operation of each component is described below.

The probability model calculation unit 30 calculates the gradient of the log-likelihood based on the probability model and the trajectory data (demonstration data). The method for calculating the gradient of the log-likelihood is similar to the maximum entropy inverse reinforcement learning described in non-patent literature 1, except that there are two parameters (first parameter θ and second parameter $c_m$). Specifically, the optimal parameters θ*, and $c_m$* are given by Equation 2 below. N is the number of trajectory data (demonstration data).

[Math. 3]

$$\theta^*, c^* = \mathrm{argmax}_{\theta,c} \sum_{i=1}^{N} \log P(x \mid \theta, c) \quad \text{where } c = (c_1, \ldots, c_m) \qquad \text{(Equation 2)}$$

The probability model calculation unit 30 then calculates the gradient ∇L (θ, $c_m$) of the log-likelihood using Equation 3, which is illustrated below.

[Math. 4]

$$\nabla L(\theta, c) = \frac{1}{N} \sum_{i=1} f_{s_i} - \sum_{i=1} P(x \mid \theta, c) f_{s_i} \quad \text{where } c = (c_1, \ldots, c_m) \qquad \text{(Equation 3)}$$

The updating unit 40 updates the reward function and the constraint conditions so as to maximize the log-likelihood calculated by the probability model calculation unit 30. The updating unit 40 includes a reward function updating unit 41 and a constraint condition updating unit 42.

In this exemplary embodiment, the first function, which indicates the distribution based on the reward function, is expressed using the first parameter θ, and the constraint condition is expressed using the second parameter $c_m$. Therefore, the reward function updating unit 41 updates the first parameter θ to maximize the log-likelihood. The constraint condition updating unit 42 also updates the second parameter $c_m$ so as to maximize the log-likelihood. Let the gradient derivative $\nabla \rightarrow (\nabla_\theta, \nabla_{cm})$, the reward function updating unit 41 updates the first parameter θ as shown in Equation 4, illustrated below, and the constraint condition updating unit 42 updates the second parameter $c_m$ as shown in Equation 5, illustrated below.

[Math. 5]

$$\theta \leftarrow \theta - \alpha \nabla_\theta L(\theta, c_m) \qquad \text{(Equation 4)}$$

$$c_m \leftarrow c_m - \beta \nabla_{c_m} L(\theta, c_m) \qquad \text{(Equation 5)}$$

The method in which the reward function updating unit 41 updates the first parameter θ to maximize the log-likelihood is the same as the maximum entropy inverse reinforcement learning described in non-patent literature 1. On the other hand, in this exemplary embodiment, the constraint condition updating unit 42 updates the parameter of the constraint condition (the second parameter $c_m$) to maximize the above log-likelihood together with the updating of the first parameter θ by the reward function updating unit 41. In other words, the probability model calculation unit 30 and the updating unit 40 in this exemplary embodiment perform inverse reinforcement learning based on the distribution of trajectory data calculated using differentiable functions that indicate the distribution of constraint conditions. This makes it possible to learn the appropriate reward function and constraint condition at the same time.

The convergence determination unit 50 determines whether the parameters of the reward function and constraints have converged. Specifically, the convergence determination unit 50 determines that the parameters of the reward function and the constraint condition have converged when the gradient of the log-likelihood (more precisely, $\nabla_\theta$ L(θ, $c_m$) and $\nabla_{cm}$ L(θ, $c_m$)) is below a specified threshold value.

On the other hand, if it is determined that the parameters have not converged, the probability model calculation unit 30 updates the probability model with the updated parameters (first parameter θ and second parameter $c_m$) and calculates the gradient of the log-likelihood based on the updated probability model and the demonstration data. The updating unit 40 then updates the reward function and constraint condition to maximize the log-likelihood calculated by the probability model calculation unit 30.

The output unit 60 outputs the reward function and constraint condition derived by inverse reinforcement learning. More specifically, the output unit 60 outputs the reward function and constraint condition indicated by the updated parameters when it is determined that the parameters have converged.

The input unit 20, the learning unit 70 (more specifically, the probability model calculation unit 30, the updating unit 40 (more specifically, the reward function updating unit 41 and the constraint condition updating unit 42), and the convergence determination unit 50), and the output unit 60 are realized by a processor (for example, CPU (Central Processing Unit), GPU (Graphics Processing Unit), FPGA (Field-Programmable Gate Array), quantum processor (quantum computer control chip)) of a computer that operates according to a program (learning program).

For example, a program may be stored in a storage unit 10 provided by the learning device 100, and the processor may read the program and operate as the input unit 20, the learning unit 70 (more specifically, the probability model calculation unit 30, the updating unit 40 (more specifically, the reward function updating unit 41 and the constraint condition updating unit 42), and the convergence determination unit 50), and the output unit 60 according to the program. In addition, the functions of the learning device 100 may be provided in the form of Saas (Software as a Service).

The input unit 20, the learning unit 70 (more specifically, the probability model calculation unit 30, the updating unit 40 (more specifically, the reward function updating unit 41 and the constraint condition updating unit 42), and the convergence determination unit 50), and the output unit 60 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the learning device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

Figure 2:
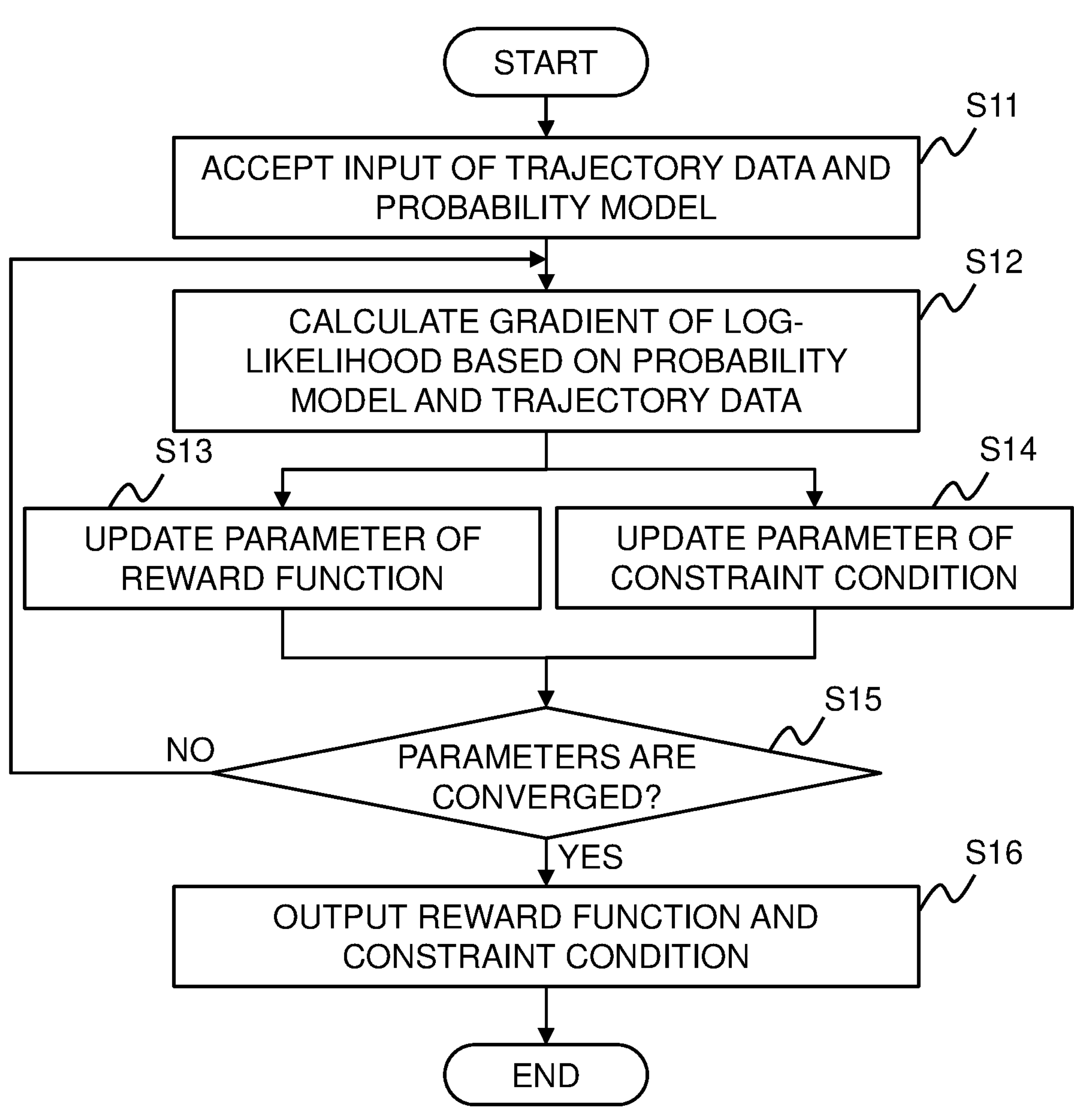
FIG. 2 It depicts a flowchart illustrating an operation example of the learning device.

Next, the operation of this exemplary embodiment of the learning device 100 will be described. FIG. 2 is a flowchart illustrating an operation example of the learning device 100 of this exemplary embodiment. The input unit 20 accepts input of trajectory data (i.e., trajectory/decision-making history data of experts) and probability models (step S11). The probability model calculation unit 30 calculates the gradient of the log-likelihood based on the probability model and trajectory data (step S12). The reward function updating unit 41 updates the parameters of the reward function to maximize the log-likelihood (step S13), and the constraint condition updating unit 42 updates the parameters of the constraint condition to maximize the log-likelihood (step S14).

The convergence determination unit 50 determines whether the parameters of the reward function and constraint conditions have converged or not (Step S15). If it is determined that the parameters have not converged (NO in step S15), the process from step S12 is repeated using the updated parameters. On the other hand, if it is determined that the parameters have converged (YES in step S15), the output unit 60 outputs the reward function and constraint conditions derived by inverse reinforcement learning (step S16).

As described above, in this exemplary embodiment, the input unit 20 accepts input of trajectory data, the learning unit 70 performs inverse reinforcement learning using the trajectory data, and the output unit 60 outputs the reward function and constraint condition derived by inverse reinforcement learning. In doing so, the learning unit 70 performs inverse reinforcement learning based on distribution of the trajectory data calculated using a differentiable function that indicates distribution of constraint condition.

More specifically, the input unit 20 accepts inputs of trajectory data and a probability model, and the probability model calculation unit 30 calculates the gradient of the log-likelihood based on the probability models and trajectory data. Then, the updating unit 40 updates the reward function and constraint condition to maximize the log-likelihood. Specifically, the probability model is defined as the product of a first function that indicates distribution based on the reward function expressed using the first parameter $\theta$ and a second function that indicates distribution based on the constraint condition expressed using the second parameter $c_m$, and the updating unit 40 updates the first parameter and the second parameter to maximize the log-likelihood.

Thus, when inverse reinforcement learning is performed using trajectory data representing human decision-making history, the appropriate reward function and constraint condition can be learned simultaneously.

For example, in order to reproduce expert's decision-making in cases where constraint conditions such as prohibited actions or rules are implicitly set, it is desirable to be able to learn not only the objective function but also the constraint conditions (together with the formulation as an optimization problem). In this exemplary embodiment, the probability model calculation unit 30 and the updating unit 40 learn the objective function and the constraint conditions simultaneously, i.e., estimate the reward function from the trajectory data, and also estimate the constraint conditions automatically. Therefore, the action and decision-making of an expert can be formulated as an optimization problem, thereby enabling reproduction of the expert's actions.

Figure 3:
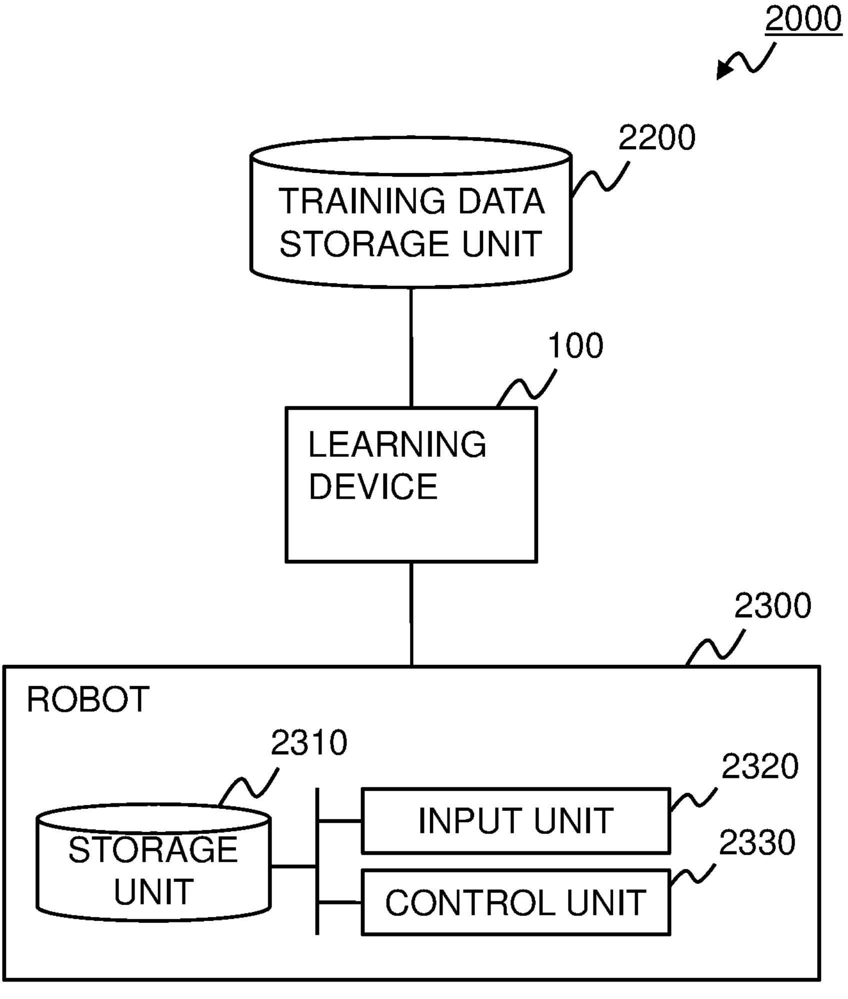
FIG. 3 It depicts a block diagram illustrating a configuration example of one exemplary embodiment of a robot control system.

Next, a specific example of a robot control system using the learning device 100 of this exemplary embodiment will be described. FIG. 3 is a block diagram illustrating a configuration example of one embodiment of a robot control system. The robot control system 2000 illustrated in FIG. 3 includes a learning device 100, a training data storage unit 2200, and a robot 2300.

The learning device 100 illustrated in FIG. 3 is the same as the learning device 100 in the above exemplary embodiment. The learning device 100 stores the reward function and constraint conditions created as a result of learning in the storage unit 2310 of the robot 2300 described below.

The training data storage unit 2200 stores training data used by the learning device 100 for learning. The training data storage unit 2200 may, for example, store trajectory data (demonstration data).

The robot 2300 is a device that operates based on a reward function. The robot here is not limited to a device shaped to resemble a human or an animal, but also includes a device that performs automatic tasks (automatic operation, automatic control, etc.). The robot 2300 includes a storage unit 2310, an input unit 2320, and a control unit 2330.

The memory unit 2310 stores the reward function and constraint conditions learned by the learning device 100.

The input unit 2320 accepts input of data indicating the state of the robot in operation.

The control unit 2330 determines actions to be performed by the robot 2300 based on the received (state-indicating) data and the reward function stored in the storage unit 2310. The method in which the control unit 2330 determines the control action based on the reward function is widely known, and a detailed explanation is omitted here. In this exemplary embodiment, a device such as the robot 2300, which performs automatic tasks, can be controlled based on a reward function that reflects the intention of an expert.

Figure 4:
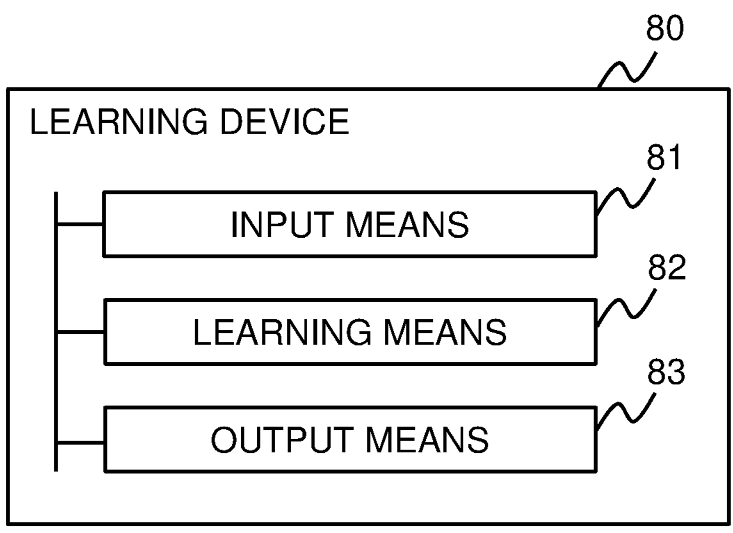
FIG. 4 It depicts a block diagram illustrating the outline of a learning device according to the present exemplary embodiment.

The following is an overview of this exemplary embodiment. FIG. 4 is a block diagram illustrating the outline of a learning device according to the present exemplary embodiment. The learning device 80 (e.g., learning device 100) according to this exemplary embodiment include an input means 81 (e.g., input unit 20) which accepts input of trajectory data (e.g., demonstration data) indicating the subject's decision-making history, a learning means 82 (e.g., learning unit 70) which performs inverse reinforcement learning using the trajectory data, and an output means 83 (e.g., the output unit 60) which outputs a reward function and a constraint condition derived by inverse reinforcement learning.

The learning means 82 performs inverse reinforcement learning based on distribution of the trajectory data calculated using a differentiable function that indicates distribution of the constraint condition.

Such a configuration allows an appropriate reward function and constraint conditions to be learned simultaneously when inverse reinforcement learning is performed using trajectory data indicating human decision-making history.

The input means 81 may accept input of a probabilistic model (e.g., p(x)) that assumes a distribution of trajectory data derived by maximum entropy principle based on the reward function (e.g., $f_\theta$ (x)) and the constraint condition (e.g., $g_{cm}$ (x)), the learning means 82 (e.g., probability model calculation unit 30 and updating unit 40) may calculate a gradient of a log-likelihood based on a probability model and trajectory data, and may update the reward function and the constraint condition to maximize the log-likelihood. Here, the probability model may be defined as product of a first function indicating distribution based on the reward function expressed using a first parameter (e.g., $\theta$) and a second function indicating distribution based on the constraint condition expressed using a second parameter (e.g., $c_m$) (e.g., Equation 1), and the learning means 82 may update the first parameter and the second parameter to maximize the log-likelihood.

The learning device 80 may further include a determination unit (e.g., convergence determination unit 50) which determines whether the first parameter and the second parameter have converged. When the parameters are not determined to have converged, the learning means 82 may calculate the gradient of the log-likelihood based on the probability model defined by the updated first parameter and second parameter and the trajectory data, and may update the first parameter and second parameter to maximize the log-likelihood.

The second function may be defined as a continuous function differentiable by the second parameter such that the more each constraint condition is satisfied, the closer it approaches 1, and the less each such constraint condition is satisfied, the closer it approaches 0.

The probability model may be defined as a function that takes a larger probability value the larger a value of the reward function and a larger probability value the more constraint condition is satisfied.

The second function may be defined by the total power of a sigmoid function whose argument is a constraint condition that indicates a non-negative value when each constraint condition is satisfied.

Figure 5:
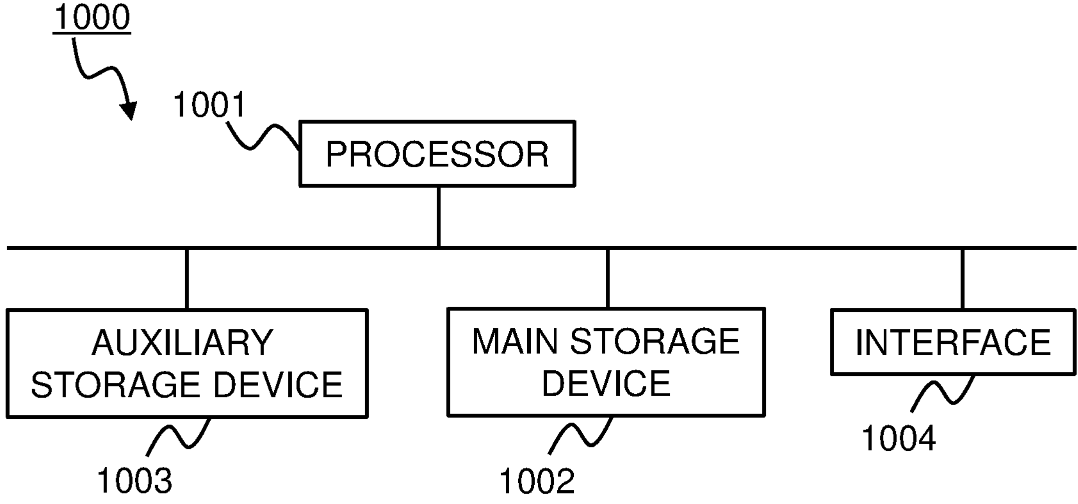
FIG. 5 It depicts a schematic block diagram illustrating a configuration of a computer according to at least one of exemplary embodiments.

FIG. 5 is a schematic block diagram illustrating a configuration of a computer according to at least one exemplary embodiment. A computer 1000 includes a processor 1001, a main storage device 1002, an auxiliary storage device 1003, and an interface 1004.

The learning device 90 described above is implemented in the computer 1000. Then, the operation of each processing unit described above is stored in the auxiliary storage device 1003 in the form of a program (learning program). The processor 1001 reads the program from the auxiliary storage device 1003, develops the program in the main storage device 1002, and executes the above processing according to the program.

Note that, in at least one exemplary embodiment, the auxiliary storage device 1003 is an example of a non-transitory tangible medium. Other examples of the non-transitory tangible medium include a magnetic disk, a magneto-optical disk, a compact disc read-only memory (CD-ROM), a digital versatile disk (DVD)-ROM, a semiconductor memory, and the like connected via the interface 1004. Furthermore, in a case where the program is distributed to the computer 1000 via a communication line, the computer 1000 that has received the program may develop the program in the main storage device 1002 and execute the above processing.

Furthermore, the program may be for implementing some of the functions described above. In addition, the program may be a program that implements the above-described functions in combination with another program already stored in the auxiliary storage device 1003, a so-called difference file (difference program).

Although some or all of the above exemplary embodiments may also be described as in the following Supplementary notes, but not limited to the following.

(Supplementary note 1) A learning device comprising:

an input means which accepts input of trajectory data indicating the subject's decision-making history;

a learning means which performs inverse reinforcement learning using the trajectory data; and an output means which outputs a reward function and a constraint condition derived by inverse reinforcement learning, wherein the learning means performs inverse reinforcement learning based on distribution of the trajectory data calculated using a differentiable function that indicates distribution of the constraint condition.

(Supplementary note 2) The learning device according to Supplementary note 1, wherein the input means accepts input of a probabilistic model that assumes a distribution of trajectory data derived by maximum entropy principle based on the reward function and the constraint condition, the learning means calculates a gradient of a log-likelihood based on a probability model and trajectory data, and updates the reward function and the constraint condition to maximize the log-likelihood, the probability model is defined as product of a first function indicating distribution based on the reward function expressed using a first parameter and a second function indicating distribution based on the constraint condition expressed using a second parameter, and the learning means updates the first parameter and the second parameter to maximize the log-likelihood.

(Supplementary note 3) The learning device according to Supplementary note 2, further comprising a determination unit which determines whether the first parameter and the second parameter have converged, wherein, when the parameters are not determined to have converged, the learning means calculates the gradient of the log-likelihood based on the probability model defined by the updated first parameter and second parameter and the trajectory data, and updates the first parameter and second parameter to maximize the log-likelihood.

(Supplementary note 4) The learning device according to any one of Supplementary notes 1 to 3, wherein the second function is defined as a continuous function differentiable by the second parameter such that the more each constraint condition is satisfied, the closer it approaches 1, and the less each such constraint condition is satisfied, the closer it approaches 0.

(Supplementary note 5) The learning device according to any one of Supplementary notes 1 to 4, wherein the probability model is defined as a function that takes a larger probability value the larger a value of the reward function and a larger probability value the more constraint condition is satisfied.

(Supplementary note 6) The learning device according to any one of Supplementary notes 1 to 5, wherein the second function is defined by the total power of a sigmoid function whose argument is a constraint condition that indicates a non-negative value when each constraint condition is satisfied.

(Supplementary note 7) A learning method comprising:

accepting input of trajectory data indicating the subject's decision-making history; performing inverse reinforcement learning using the trajectory data;

outputting a reward function and a constraint condition derived by inverse reinforcement learning; and in inverse reinforcement learning, inverse reinforcement learning is performed based on distribution of the trajectory data calculated using a differentiable function that indicates distribution of the constraint condition.

(Supplementary note 8) The learning method according to Supplementary note 7, further comprising:

accepting input of a probabilistic model that assumes a distribution of trajectory data derived by maximum entropy principle based on the reward function and the constraint condition;

a probability model is defined as product of a first function indicating distribution based on the reward function expressed using a first parameter and a second function indicating distribution based on the constraint condition expressed using a second parameter;

calculating a gradient of a log-likelihood based on the probability model and trajectory data, and updating the reward function and the constraint condition to maximize the log-likelihood; and updating the first parameter and the second parameter to maximize the log-likelihood.

(Supplementary note 9) A program storage medium which stores a learning program for causing a computer to execute:

input processing to accept input of trajectory data indicating the subject's decision-making history;

learning processing to perform inverse reinforcement learning using the action trajectory data; and output processing to output a reward function and a constraint condition derived by inverse reinforcement learning, wherein inverse reinforcement learning is performed based on distribution of the trajectory data calculated using a differentiable function that indicates distribution of the constraint condition, in the learning processing.

(Supplementary note 10) The program storage medium according to Supplementary note 9, wherein in the input processing, input of a probabilistic model that assumes a distribution of trajectory data derived by maximum entropy principle based on the reward function and the constraint condition is accepted, in the learning processing, a gradient of a log-likelihood based on a probability model and trajectory data is calculated, and the reward function and the constraint condition are updated to maximize the log-likelihood, the probability model is defined as product of a first function indicating distribution based on the reward function expressed using a first parameter and a second function indicating distribution based on the constraint condition expressed using a second parameter, and in the learning processing, the first parameter and the second parameter are updated to maximize the log-likelihood.

(Supplementary note 11) A learning program for causing a computer to execute:

input processing to accept input of trajectory data indicating the subject's decision-making history;

learning processing to perform inverse reinforcement learning using the action trajectory data; and output processing to output a reward function and a constraint condition derived by inverse reinforcement learning, wherein inverse reinforcement learning is performed based on distribution of the trajectory data calculated using a differentiable function that indicates distribution of the constraint condition, in the learning processing.

(Supplementary note 12) The learning program according to Supplementary note 11, wherein in the input processing, input of a probabilistic model that assumes a distribution of trajectory data derived by maximum entropy principle based on the reward function and the constraint condition is accepted, in the learning processing, a gradient of a log-likelihood based on a probability model and trajectory data is calculated, and the reward function and the constraint condition are updated to maximize the log-likelihood, the probability model is defined as product of a first function indicating distribution based on the reward function expressed using a first parameter and a second function indicating distribution based on the constraint condition expressed using a second parameter, and in the learning processing, the first parameter and the second parameter are updated to maximize the log-likelihood.

REFERENCE SIGNS LIST

10 Storage unit
20 Input unit
30 Probability model calculation unit
40 Updating unit
41 Reward function updating unit
42 Constraint condition updating unit
50 Convergence determination unit
60 Output unit
100 Learning device

What is claimed is:

1. A learning device comprising:

a memory storing instructions; and one or more processors configured to execute the instructions to:

accept input of trajectory data indicating the subject's decision-making history;

perform inverse reinforcement learning using the trajectory data; and output a reward function and a constraint condition derived by inverse reinforcement learning, wherein the inverse reinforcement learning is performed based on distribution of the trajectory data calculated using a differentiable function that indicates distribution of the constraint condition.

2. The learning device according to claim 1, wherein the processor is configured to execute the instructions to:

accept input of a probabilistic model that assumes a distribution of trajectory data derived by maximum entropy principle based on the reward function and the constraint condition;

calculate a gradient of a log-likelihood based on a probability model and trajectory data, and update the reward function and the constraint condition to maximize the log-likelihood;

the probability model is defined as product of a first function indicating distribution based on the reward function expressed using a first parameter and a second function indicating distribution based on the constraint condition expressed using a second parameter; and update the first parameter and the second parameter to maximize the log-likelihood.

3. The learning device according to claim 2, wherein the processor is configured to execute the instructions to:

determine whether the first parameter and the second parameter have converged; and when the parameters are not determined to have converged, calculate the gradient of the log-likelihood based on the probability model defined by the updated first parameter and second parameter and the trajectory data, and update the first parameter and second parameter to maximize the log-likelihood.

4. The learning device according to claim 1, wherein the second function is defined as a continuous function differentiable by the second parameter such that the more each constraint condition is satisfied, the closer it approaches 1, and the less each such constraint condition is satisfied, the closer it approaches 0.

5. The learning device according to claim 2, wherein the probability model is defined as a function that takes a larger probability value the larger a value of the reward function and a larger probability value the more constraint condition is satisfied.

6. The learning device according to claim 1, wherein the second function is defined by the total power of a sigmoid function whose argument is a constraint condition that indicates a non-negative value when each constraint condition is satisfied.

7. A learning method comprising:

accepting input of trajectory data indicating the subject's decision-making history;

performing inverse reinforcement learning using the trajectory data;

outputting a reward function and a constraint condition derived by inverse reinforcement learning; and inverse reinforcement learning is performed based on distribution of the trajectory data calculated using a differentiable function that indicates distribution of the constraint condition.

8. The learning method according to claim 7, further comprising:

accepting input of a probabilistic model that assumes a distribution of trajectory data derived by maximum entropy principle based on the reward function and the constraint condition;

a probability model is defined as product of a first function indicating distribution based on the reward function expressed using a first parameter and a second function indicating distribution based on the constraint condition expressed using a second parameter;

calculating a gradient of a log-likelihood based on the probability model and trajectory data, and updating the reward function and the constraint condition to maximize the log-likelihood; and updating the first parameter and the second parameter to maximize the log-likelihood.

9. A non-transitory computer readable information recording medium storing a learning program, when executed by a processor, that performs a method for:

accepting input of trajectory data indicating the subject's decision-making history;

performing inverse reinforcement learning using the action trajectory data; and outputting a reward function and a constraint condition derived by inverse reinforcement learning, wherein inverse reinforcement learning is performed based on distribution of the trajectory data calculated using a differentiable function that indicates distribution of the constraint condition, in the learning processing.

10. The non-transitory computer readable information recording medium according to claim 9, wherein input of a probabilistic model that assumes a distribution of trajectory data derived by maximum entropy principle based on the reward function and the constraint condition is accepted, a gradient of a log-likelihood based on a probability model and trajectory data is calculated, and the reward function and the constraint condition are updated to maximize the log-likelihood, the probability model is defined as product of a first function indicating distribution based on the reward function expressed using a first parameter and a second function indicating distribution based on the constraint condition expressed using a second parameter, and the first parameter and the second parameter are updated to maximize the log-likelihood.

* * * * *